United States Patent
Mendelson (10) Patent No.: US 9,020,687 B2
(45) Date of Patent: Apr. 28, 2015

(54) SYSTEM AND METHOD OF OBTAINING AND USING A VEHICLE IDENTIFIER FOR PROVIDING INFORMATION TO AN END USER

(76) Inventor: Ehud Mendelson, Coral Springs, FL (US)

( * ) Notice: Subject to any disclaimer, the term of this patent is extended or adjusted under 35 U.S.C. 154(b) by 102 days.

(21) Appl. No.: 12/930,735

(22) Filed: Jan. 14, 2011

(65) Prior Publication Data
US 2014/0213176 A1    Jul. 31, 2014

Related U.S. Application Data

(63) Continuation-in-part of application No. 11/396,843, filed on Apr. 3, 2006, now Pat. No. 7,899,583.

(60) Provisional application No. 60/670,097, filed on Apr. 12, 2005.

(51) Int. Cl.
| | |
|---|---|
| G07C 5/08 | (2006.01) |
| G01C 21/00 | (2006.01) |
| G08G 1/14 | (2006.01) |
| G01C 21/20 | (2006.01) |
| G06Q 20/32 | (2012.01) |
| G07B 15/00 | (2011.01) |
| H04B 7/24 | (2006.01) |

(52) U.S. Cl.
CPC ............ *G01C 21/00* (2013.01); *G08G 1/14* (2013.01); *G01C 21/206* (2013.01); *G06Q 20/327* (2013.01); *G07B 15/00* (2013.01); *H04B 7/24* (2013.01)

(58) Field of Classification Search
USPC .......... 701/1, 400, 468–469, 31.5; 340/932.2, 340/933
See application file for complete search history.

(56) References Cited

U.S. PATENT DOCUMENTS

| | | | |
|---|---|---|---|
| 3,114,128 A | 12/1963 | Ljungman | |
| 3,130,298 A | 4/1964 | Schwarz | |
| 3,158,836 A | 11/1964 | McCauley | |
| 3,166,732 A | 1/1965 | Ljungman | |
| 3,867,615 A | 2/1975 | Sioufi | |
| 5,272,483 A | 12/1993 | Kato | |
| 5,293,163 A | 3/1994 | Kakihara | |
| 5,383,127 A | 1/1995 | Shibata | |
| 5,416,712 A | 5/1995 | Geier | |
| 5,432,508 A | 7/1995 | Jackson | |
| 5,442,348 A | 8/1995 | Mushell | |
| 5,454,461 A | 10/1995 | Jacobs | |
| 5,485,520 A * | 1/1996 | Chaum et al. | 705/74 |
| 5,504,482 A | 4/1996 | Schreder | |
| 5,606,506 A | 2/1997 | Kyrtsos | |

(Continued)

*Primary Examiner* — Yonel Beaulieu
(74) *Attorney, Agent, or Firm* — Allen D. Hertz, P.A.; Allen D. Hertz (57) ABSTRACT

A wireless transmitter using Wi-Fi or long range Bluetooth wireless devices for emitting a signal including one of the vehicle ID or the VIN. The signal is received by one or more deployed RF receivers. The received data can be utilized to aid an individual in locating a parking location of a specific vehicle, for use in recognizing the vehicle for passage through a tollway, a gate, or any other controlled passageway. The system is capable of operating either indoors or outdoors. The one of the vehicle ID or the VIN obtained through the emitted signal from the vehicle RF device can be associated with a payment account for payment of tolls, parking, etc. Receipt and decoding of the vehicle ID or the VIN can additionally be used to initiate telematics or other applications using an association with the vehicle identifier.

16 Claims, 3 Drawing Sheets

(56) References Cited

U.S. PATENT DOCUMENTS

| | | |
|---|---|---|
| 5,910,782 A | 6/1999 | Schmitt |
| 5,940,481 A | 8/1999 | Zeitman |
| 6,028,537 A * | 2/2000 | Suman et al. ............... 340/988 |
| 2008/0071882 A1 | 3/2008 | Hering et al. |
| 2012/0188101 A1* | 7/2012 | Ganot ...................... 340/932.2 |
| 2013/0113936 A1* | 5/2013 | Cohen et al. ............... 348/148 |

* cited by examiner

SYSTEM AND METHOD OF OBTAINING AND USING A VEHICLE IDENTIFIER FOR PROVIDING INFORMATION TO AN END USER

CROSS REFERENCE TO RELATED APPLICATIONS

This U.S. Non-Provisional patent application is a Continuation-In-Part, which claims the benefit of U.S. Non-Provisional patent application Ser. No. 11/396,843 filed on Apr. 3, 2006 (now Issued U.S. Pat. No. 7,899,583 on Mar. 1, 2011) that claim the benefit of U.S. Provisional application No. 60/670,097 filed on Apr. 12, 2005.

FIELD OF THE INVENTION

This invention is directed generally to the field of "location based navigation" and, more particularly, to such method to be used in car wireless and Mobile phone telematics application such as detecting and navigating to the exact location where someone parks their car either indoors and outdoors—return2parking method and allow a car reference identification (ID) or Vehicle Identification Number (VIN) to be broadcast wirelessly for telematics applications.

BACKGROUND OF THE INVENTION

Introduction to Location Based Services (LPS)

Location based services are rapidly expanding. Outdoor location technologies are mainly based on Global Positioning System (GPS) technologies. GPS does not perform properly indoors, and even outdoor the accuracy is still at more than 100-300 feet, not accurate to a car exact space but to an area, such low accuracy can point to more than 50 cars . . . not quite accurate and again the GPS based solutions do not work indoors.

The need for a system, such as the disclosed invention, arises from various market segments and applications. One example in the market is the "Car Navigator" That uses integrated positioning and navigation systems based on GPS receivers as the primary positioning technology. Subsequent to the events of September 11th. The Federal government mandated that GPS capability be included in all cellular phones.

However, the fact that uninterrupted satellite reception is not possible in many situations is a major limitation of GPS based systems. Densely populated areas and radio-frequency-signal shadowed locations, such as urban centers (a.k.a. "urban canyons") parking garage, generally do not allow proper operation of GPS, yet it is in these locations where the need is greatest.

There is a clear need for a cost effective system that maintains performance and accuracy indoors, in urban canyons, in parking garages, and in city centers, like finding where someone parked their car.

Another important issue is that GPS itself is susceptible to jamming and other man-made interferences.

Description of the Global Positioning System (GPS) System

The Global Positioning System (GPS) is a satellite-based navigation and time transfer system developed by the U.S. Department of Defence. GPS serves marine, airborne and terrestrial users, both military and civilian. Specifically, GPS includes the Standard Positioning Service (SPS) that provides civilian users with 100 meter accuracy as to the location or position of the user. It also serves military users with the Precise Positioning Service that provides 20 meter accuracy for the user. Both of these services are available worldwide with no requirement for any local equipment.

View of GPS Limitations

A first limitation of GPS is that upon activation the GPS receiver scans for signals from the GPS satellites. The unit must locate and receive signals from at least four satellites to be able to determine its location. This process of locating the satellites, receiving the data and achieving a position fix can take several minutes. This delay is problematic for many GPS applications.

A second limitation of GPS is that the receiver needs a clear view of the sky to successfully receive signals from the satellites, again under unfriendly RF conditions such as inside buildings, in "urban canyons", inside parking garage, or in the shadows of high buildings, the GPS suffers from multi-path effects and therefore shows poor performance, or none at all.

A third Limitation—limited accuracy: There is a problem of limited accuracy of the civilian GPS signal. While knowing your position to within 50 to 200 feet anywhere on the planet is a major technological feat, it is still not accurate enough, to locate and navigate to an empty parking space, where each space measures about 10 feet, and most parking garages are located where the GPS cannot work effectively moreover as explain before there is a need for an application to find in accurate and simple way where someone parked their car.

Existing navigation systems, such as in-car navigation systems and new mandatory GPS equipped cellular phones, are based on GPS and have the aforementioned limitations.

Another significant factor adding to the limitations of the GPS based systems is the important role of map production; normally a driver, requires a map to be as detailed and as up-to-date as possible. The existing maps used by the GPS based systems provide limited detail and are not able to reflect changes on a real time basis. The recent introduction of imagery services, such as Google Earth™ and its competitors that are offered as an enhancement to GPS at a fee still provide out of date information, with the unsatisfactory result that users encounter road changes and area development not shown on the maps and imagery.

In this modern age when urban development is exploding, the lack of details and updates of the topographic maps and satellite images is critical; additionally and importantly, indoor location maps and indoor parking garage map are not available for the GPS navigation systems.

The basic aspect of the present innovation is to utilize the vehicle ID and allow scanning for the vehicle ID for telematics application like return2parking, security, and have possibly great effect in term of protection from thieves.

The disclosed system and method will allow use of the car's own VIN number

To be broadcast as additional theft solution.

Car theft is common in most major cities in North America. Despite a hiatus in the 90s, the number of cars stolen has skyrocketed in the past decade. Close to 1.2 million cars were stolen in North America last year. That is nearly one car every 20 seconds. Car theft is not an innocuous problem; it is a billion dollar industry. Besides hurting the individual, it results in excess insurance premiums and takes time away from law enforcement.

There is no device that is 100 per cent anti-car-theft, but experts indicate that use of any type of mechanism will decrease the chances of your car being stolen. Most car thieves prefer to steal easy cars that have no anti-theft devices.

For the past 30 years, there have been many attempts made to develop the ultimate anti-theft car device. Many devices have come and gone and the latest anti-car-theft device is VIN etching. A VIN or Vehicle Identification Number has been placed on automobiles for more than 40 years. In most cases, the VIN is etched onto the dashboard metal plate near the steering wheel. Some manufacturers place the VIN on other parts of the car. Whenever a vehicle is reported stolen, the police broadcast this number to the FBI's central computers where it is on a database. The first thing police always do when a stolen car is recovered is check the VIN number.

The practice of etching VIN numbers onto many parts of the car including the windows and windshield has recently become very popular. Many security experts believe that this is a foolproof anti-theft mechanism. Because the VIN is obvious on the windows, the criminals have to replace the windows before they can sell the car.

In the old days, the thieves simply erased or switched the VIN number tags from the dashboard. However, when the VIN is etched on to the windows, all the windows require replacement and this can become expensive. While removing and replacing car windows is relatively simple, it certainly is not cost effective for the crook. Once the VIN is etched onto each window of the car, it acts like a fingerprint. Law enforcement can rapidly access your VIN number and check it with the national data bank to determine if the car is stolen.

While some thieves do avoid cars with etched VIN on the windows, this is not a golden rule. Many cars are stolen by teenagers simply out for a joyride and VIN etching on the windows is not a deterrent. However, there is ample data from law enforcement and insurance companies that cars etched with VIN on the windows have a low probability of getting stolen. The VIN etching system has led to other benefits; many auto dealers now regularly mark all their products to prevent theft.

Despite this new innovation, one has to remember that if a thief wants to steal your car, he or she will find a way no matter what security system you have. But in general, thieves usually target easy to pick cars. So the onus is on to you to make it slightly more difficult for the thief. The majority of cars get stolen because the owner of the car is simply careless. Leaving the keys in the car or leaving the windows open is an invitation to thieves. No amount of car theft protection is a solution for stupidity and, unfortunately, there is no cure for being foolish either. However, with the proposed solution, the vehicle owner may win in the end.

The present invention takes that solution a step forward and utilizes the car digital ID, meaning assigning the car an ID or use the current car ID, the Vehicle Identification Number (VIN), the same number that is assigned physically to the car from manufacture as a car ID and allow it to be broadcast digitally and wirelessly.

To explain the proposed solution it easy to compare the car license plate as an Internet Protocol (IP) address. One can think of an IP Address like a vehicle's license plate. Every vehicle driving on the road has a license plate which is registered to the local DMV. The license plate is kind of like the car's identification card, which allows someone (usually a law enforcement officer) to run the plate and find out all kinds of information about the owner of the vehicle in which the license plate is registered to. An IP Address works the same way. Every computer surfing the web has to have some type of identifying IP Address, whether it be an IP assigned to the actual computer, the router the computer is connected to, or the proxy server the computer is connecting with. This address is what identifies a computer on the web as a license plate is what identifies a vehicle on the road.

A Media Access Control (MAC) Address on the other hand is the physical address of the Network Interface Cards (NIC) in a computer (equivocal to a serial number). On broadcast networks, such as Ethernet, the MAC address uniquely identifies each node (workstation/computer) for specific packet delivery. A NIC's MAC address would be analogous to a vehicle's VIN number for use in this application. The MAC address identifies the physical networking hardware in an manner which is similar to the way a vehicle's VIN identifies a specific vehicle.

These analogies are to help one understand that a dynamic IP Address can change just like a vehicle's license plate number can be changed. Conversely, a MAC Address cannot be changed just like a vehicle's VIN cannot be changed.

Application

In general, the disclosed system is based on method to assign the car ID (again it can be the same as the car VIN number or other assign name and ID) it can be assign by the car manufacture as built-in the car or as an add-on assign by the car owner and allow the ID to be broadcast wirelessly for telematics applications.

The present invention focuses on a solution that can work outdoors as well as indoors without the need for GPS that, as described before, has the limitations in term of indoors and the accuracy needed to find the exact location of the car, either indoors, in a parking garage or just have the ability to use the broadcast ID for additional theft protection, tracking capabilities allow use the ID for secure access when need precise ID of the car and not only a remote clicker that can be transfer between cars or "car pass" to allow toll or access road as well as security and marketing or easy statistically information.

Examples of Indoor Applications

The application can be for the car owner benefit as well for municipals or police.

The user may wish to locate where he parked his car outdoors, indoors, in a garage, or in the street.

The user may wish to use his car ID as replacement or add-on for payment such as toll roads, pay to park or at the gas station using his car ID wirelessly as a payment trigger mechanism.

The user may be looking to access a designated area that requires a specific ID , or an area needed to open a gate using a remote, instead of the remote he can use his car ID for such access.

Police can now scan and search for car from remote area and scan the area for the car instead of going one by one to verify licence plate.

The car owner or authorities can use the broadcast ID to scan for stolen cars.

Such system can serve as add-on to the car alarming and may be the ideal solution to lower car theft.

It may be ideal solution as add on with additional sensor to trigger broadcasting from the car when needed like in emergency.

Or again, the car owner may just wish to locate his car and answer to the most demanding dilemma of any driver, "Where did I park my car?"

By using and modifying existing technology, the disclosed system will integrate easily with other transportation and communication systems.

REFERENCE TO PRIOR ART

Parking

Despite the problems encountered by vehicle operators at parking facilities, most existing parking monitoring systems focus on collecting information for management. Some prior art systems employ sensors at entrances and exits to parking facilities or sections of such facilities (See U.S. Pat. No. 3,130,298 to Schwarz). These sensors trigger a counter to determine the number of cars in the monitored area by subtracting the number of cars leaving the area from those that have entered. At least one of these monitoring systems also engages a timer to determine the aggregate usage time of the facility by summing the total time from the entry of the cars to their departure (See U.S. Pat. No. 3,867,615 to Sioufi). These systems profess to be useful in monitoring the usage of the parking facility.

Curbside parking monitoring systems have been coupled with centralized signals which indicate general areas where drivers may find a curbside parking space (see U.S. Pat. Nos. 3,114,128 and 3,166,732 to Ljungman). Upon sensing that a space adjacent a parking meter is vacant, the system signals drivers from a signpost at an intersection of the city block along which the parking space is vacant. The signal appears in a binary yes or no stating that one or more parking spaces are available in the adjacent block-long area. However, because the driver seeing a parking available signal is not advised of the number and specific location of parking spaces that are available in that block, the vehicle operator may proceed to the indicated location to find that a single available space has already been occupied or that the space will not accommodate his vehicle. In either situation, the binary availability signal may lead the vehicle operator on a fruitless quest.

Another monitoring system for a parking facility compares the number of cars within a designated area (determined by counting cars entering minus cars departing the area) with the number of spaces within that area. When the net number of cars equals the number of spaces, the system registers that the area is completely full and signals drivers to proceed to the next area (see U.S. Pat. No. 3,158,836 to McCauley). Unfortunately, such systems again only yield a binary yes or no signal to the drivers. Even if an area contains only one available space, even if the space is obstructed, will not accommodate the driver's car, or is otherwise undesirable, a driver still will be lead to that area.

These known systems are of only limited help to vehicle operators and do not resolve many concerns associated with parking an automobile.

U.S. Pat. No. 5,293,163 to Kakihara, et al., entitled, "Navigation Apparatus for Vehicles", describes a system for finding garages or other parking facilities with available parking spaces. It provides for the display of available parking information in map format. This vehicle navigational system patent does not address the problem of locating available on-street parking. Instead, it addresses the problem of locating parking lots with available spaces. Parking lots in congested city areas are not very cost effective, and they may not be in close proximity to the driver's destination. The patent does not direct drivers directly to an available metered space, a less expensive alternative, but simply to a large parking lot where they will have to search for an available space. In addition, the Kakihara map display only directs the driver as far as a parking facility. The driver still must navigate around the parking facility to locate an available space.

U.S. Pat. No. 5,432,508 to Jackson, entitled, "Technique for Facilitating and Monitoring Vehicle Parking", describes a scheme for finding available parking spaces in garages and other parking facilities. It provides for the display of available parking information at the entrance of a garage and makes a provision for a light source to be mounted above a parking space to indicate its availability. Remote access to the data is provided by a dial-up telecommunication interface. Because the technique described operates over a wire line medium, it does not lend itself to being easily deployed in a wide area. Also, because parking information is never provided to any device within a vehicle, drivers still need to navigate through a garage to locate available spaces.

Parking meters with sensors, parking meters with transmitters, and navigational equipment receiving and displaying external information are well known in the art. U.S. Pat. No. 5,442,348 entitled, "Computerized Parking Meter", for example, describes a parking meter utilizing an ultrasonic transducer to detect when a car is occupying a parking space. Similarly, U.S. Pat. No. 5,454,461, entitled, "Electronic Parking Meter and System", describes a parking meter utilizing a sonar transducer for parked vehicle detection and radio means for receiving billing information.

Accurate Navigation

U.S. Pat. No. 5,504,482 to Schreder describes an automobile equipped with an inertial and satellite navigation system as well as a local area digitized street map. The main use of this patent is for route guidance in the presence of traffic jams, etc. Schreder describes how information as to the state of the traffic on a highway can be transmitted and utilized by a properly equipped vehicle to change the route the driver would take in going to his destination. Schreder does not disclose sub-meter vehicle location accuracy determination

Vehicle Location

U.S. Pat. No. 5,272,483 to Kato describes an automobile navigation system. This invention attempts to correct for the inaccuracies in the GPS system through the use of an inertial guidance, geomagnetic sensor, or vehicle crank shaft speed sensor. However, it is unclear as to whether the second position system is actually more accurate than the GPS system. This combined system, however, cannot be used for sub-meter positioning of an automobile.

U.S. Pat. No. 5,383,127 to Shibata uses map matching algorithms to correct for errors in the GPS navigational system to provide a more accurate indication of where the vehicle is or, in particular, on what road the vehicle is. This procedure does not give sub-meter accuracy. Its main purpose is for navigation and, in particular, in determining the road on which the vehicle is travelling.

U.S. Pat. No. 5,416,712 to Geier, et al. relates generally to navigation systems and more specifically to global positioning systems that use dead reckoning apparatus to fill in as backup during periods of GPS shadowing such as occur amongst obstacles, e.g., tall buildings in large cities. This patent shows a method of optimally combining the information available from GPS even when less than 3 or 4 satellites are available with information from a low-cost, inertial gyro, having errors that range from 1-5%. This patent provides an excellent analysis of how to use a modified Kalman filter to optimally use the available information.

U.S. Pat. No. 5,606,506 to Kyrtsos provides a good background of the GPS satellite system. It discloses a method for improving the accuracy of the GPS system using an inertial guidance system. This is based on the fact that the GPS signals used by Kyrtsos do not contain a differential correction and the selective access feature is on locating a vacant parking space is an ordeal that causes frustration for many commuters. Even if a commuter pays to enter a parking lot, valuable time is consumed searching for a parking space within the parking lot. It seems that parking lots that service hospitals, airports, mass transit stations, entertainment forums, shopping malls and the like are always the most crowded, when time is the most crucial. As urban and suburban regions become more populated, finding a vacant parking space will become increasingly difficult for commuters.

U.S. Pat. No. 5,910,782 to Schmitt et al. ('782 patent) discloses a system for finding available on-street parking using an on-board vehicle navigation system and parking meters equipped with sensing devices. According to the '782 patent, real time metered parking space information can be accessed from a central location or directly by a vehicle, upon entering a specific geographic area.

U.S. Pat. No. 5,940,481 to Zeitman ('481 patent) discloses a parking management control system used to report parking, monitor parking and reserve parking spaces. According to the '481 patent, a user reports parking in a particular parking facility to a central control unit using a personal non-dedicated mobile communications device. The central control unit then confirms whether parking in the particular parking facility is authorized or not. The central control unit also generates a report indicating which parking facilities are supposed to be vacant for law enforcement officials so that unauthorized parking can be ticketed. The '481 patent also discloses that a user can reserve a desired parking facility by selecting a desired parking facility from a map provided from the central control unit. If a potential user, other than the registered user, communicates a request to park in the reserved parking facility, the control unit transmits a response to the potential user indicating that the parking facility is reserved and not authorized for use.

Patent Application 2008/0071882 VIN number obtaining method by General Motors, Corporation c/o Reising Ethington Barnes Kisselle, an electronic VIN request is generated at the vehicle through a vehicle user interface, such as a visual display, a microphone, a speaker, a keypad, or an electronic control or button. According to another embodiment, the electronic VIN request is generated at an entity, such as a remote call center, that is remotely located from the vehicle. In either case, the electronic VIN request causes the vehicle hardware to query one or more vehicle electronic module(s) for electronic VIN(s) stored therein, so that output related to the electronic VIN(s) can be provided.

The VIN ID is generate and send to a call center via internet or communication method where the ID need to be sent via communication device to a call center data base the car device needed vehicle electronic module includes at least one module selected from the group consisting of: an instrument cluster module, a body control module, an engine control module, and a power train control module clearly a complete deferent system and method from the disclosed innovation where the invention uses a Wi-Fi or Bluetooth tag/beacon with an assigned ID to become the car ID and allows it to be broadcast, without using the Internet, cellular technology, web based communication, or any two-way communication at all, as the associated tag/beacon will be scanned for ID only and there is no exchange of communication like describe on the patent application above.

A smart phone application to help find your parked car—most are based on GPS and as describe above are not effective indoors and the low accuracy of the GPS (over 50 m) making it not practical for precise finding.

Other applications utilize the smart phone camera with somehow primitive way to record the location where one parks their car or to have an SMS message deliver with information about the location, such solution are not ways to exactly navigate the user to the car but provide more information to assist the user to find their parked car.

RFID locators are RFID based device and not Wi-Fi or Bluetooth and such communication method—RFID has a very limit range and the signal is blocked by cars and people.

Lojack™ tracking systems are theft recovery system for locating stolen vehicles only and not providing the car owner the user ability to find his parking car or other telematics applications.

On-Star™ vehicle communication system provides remote vehicle diagnostics and emergency assistant and are based on cellular communication and does not offer the user other telematics application like return2parking.

Wireless RFID-auto-finder are keychain device and a battery powered device mount in the car it transfer data between the receiver and the finder device and using a tone-audio generation inside the finder to point to the direction of the parked car, have limit range and are not used with the user's mobile phone like the disclosed innovation and are not set to be built in the car and also are not set to broadcast the vehicle ID for other telematics applications.

At the present time, however, no prior art device utilizes the capabilities to assign and broadcast the car ID or the VIN number in such method over wireless directly to the car owner mobile phone without using the Internet, cellular technology, GPS, or any other two-way communication. The car wireless device are autonomous and can be a Wi-Fi or long range Bluetooth with over 1000 m range.

The disclosed system automatically detects a signal directly from the autonomous beacon/tag built-in the car or add on to it, no real communication needed as the beacon in the car behave as it mentioned, as a beacon, meaning the system only broadcasts an ID. Other systems must have bandwidth or other communication method available, over which to send a request to a central system, call center or to a database, and then must wait for a response. This takes time!

Even if the other systems have bandwidth, they still based on the existing search concept where there is need submits a query, searches and waits for the response. All are impractical while driving and when one needs a fast response. The disclosed method provides the information automatically, without submitting any query, and the response is as fast as needed.

Again, most of the existing known art relies upon either on a GPS based system or the existing car navigator, that also depends on a GPS. Additionally, the existing mapping that these systems use has the same limitations described previously and is impractical.

Location Technologies

Various technologies are used for wireless indoor location. These may be classified in two aspects:
The algorithm—i.e. the method of location used.
The physical layer—i.e. the wireless technology used to communicate with the mobile device.

Location Methods

The methods typically used in indoor location are "borrowed" from the outdoor GPS location methods inventory. Specifically, four types of methods are used indoor:

Proximity Detection (PD), Received Signal Strength (RSSI), Time of Arrival (TOA), and Angle of Arrival (AOA).

Proximity Detection (PD)

This method relies upon a dense grid of antennas, each having a well-known position. When a mobile is detected by a single antenna, it is considered to be collocated with it. When more than one antenna detects the mobile, it is considered to be collocated with the one that receives the strongest signal. This method is relatively simple to implement. It can be implemented over different types of physical media. In particular, IR and RFID are based on this method.

Triangulation

Triangulation takes PD a step further, in the sense that it is based on measuring the signal level measurements from each antenna (possibly by using a triangulation mechanism), with respect to each mobile device. Following that, mobile is located by using a triangulation algorithm.

Like the PD method, triangulation is relatively simple to implement.

Time of Arrival (TOA)

TOA is based on triggering the mobile devices to respond, and measuring the time it takes for the response to fly back to the antenna. The elapsed time represents the distance between the two. By using distances from few antennas, a mobile's position can be triangulated. TOA is considered to be the most accurate method, because multipath effects can be filtered out. Yet, it is considerably more complex to implement, as it requires a modification to the hardware on the mobile side, as well as special modifications on the antenna side.

Angle of Arrival (AOA)

AOA is based on finding the direction of maximal signal intensity for each antenna-device pair. By finding the intersection of few such direction vectors, a mobile's position can be estimated, AOA is considerably less accurate than TOA, due to limited angular resolution and the fact that indoor much of the signal is reflected. Also, AOA antennas are more complex, as they require multi-section, highly directional antennas, and multiple RF circuitries.

WLAN (IEEE 802.11b)

This midrange wireless local networking standard, operating in the 2.4 GHz ISM band, has become very popular in public hotspots and enterprise locations during the last few years. With a typical gross bitrates of 11 Mbps and a range of 50-100 m, IEEE 802.11b is currently the dominant local wireless networking standard.

One limitation of such systems is the fact that WLAN tags are relatively bulky and power hungry. Thus, such locators are mainly useful to locate WLAN enabled instruments, such as portable computers. Note that in WLAN, antennas are actually part of access points (APs), through which devices communicate with the access network. This is also the case with Bluetooth.

Bluetooth (IEEE 802.15)

Bluetooth is a newer wireless local networking standard that operates in the 2.4 GHz ISM band. Compared to WLAN, the gross bit rates is lower (1 Mbps) but the disclosed method doesn't use data transfer at all, the new Bluetooth 4 specification allow long range of over 1000 m with low power consuming and it is ideal for beacon operation. Moreover Bluetooth is a "lighter" standard, highly ubiquitous (embedded in almost all mobile phones, PDAs, PC peripherals, etc.) Bluetooth tags are small, pocketsize transceivers and they are low cost, the proposed Bluetooth beacon has a cost that is below $10.

Every Bluetooth or Wi-Fi device's tag has allow to assign name for unique ID/name. This ID can be used for the car ID and by broadcast the ID serve eventually for the other telematics application, by decode the VIN number into Bluetooth or Wi-Fi ID at manufacture or by the car owner providing car ID to be broadcast wirelessly.

The disclosed approach pertaining to the use of Bluetooth or the Wi-Fi naming extends beyond self-exposure and introduces Bluetooth/Wi-Fi Extended Naming as a technique in which the system can recognize the Bluetooth or Wi-Fi device name as explicit instructions to trigger actions/processes in real time. The disclosed system uses the Bluetooth or the Wi-Fi module naming as a key (Sequence of numbers and letters, much like a VIN number in cars) to be decode into the Bluetooth or Wi-Fi ID/name and serve as triggering mechanism for telematics applications.

Beacon mean—Wi-Fi or Bluetooth beacon built in at the vehicle or add-on to the vehicle.

Beacon ID—the vehicle ID or the VIN number are decoded into the Wi-Fi or the Bluetooth ID.

The beacons are placed in a broadcasting mode only when the ID's are broadcast allowing the ID to be transmitted without having to be connected.

The beacon can spend most of the time in a deep "sleep" mode and only in a "wakeup" mode for scanning by the user's mobile phone device or any other assigned devices.

Because there is no data transfer and the beacon is in a "sleep" mode most of the time there is a very low power consumption from the beacon stand point and also from the user's mobile phone where battery power is very important.

The ID broadcast is serving as advertising presence and proximity detection car be trigger for such as keyless entry, security entry, gate remote access and very practically add on to the car theft protection.

The Display Method in Return2Parking Application

The display method in return2parking application is a unique way to bridge existing devices like cellular phones, and other Bluetooth or Wi-Fi devices. The present invention provides an overlay add-up display method over the mobile phone display as a real-time floating overlay Omni directional circular display on the car owner mobile phone.

The overlay add-up device/display works without mapping, a VOR like add-up display shows the direction to the parked car in the immediate area or use the garage or local area mapping at the background.

Automatic payments can be handled via systems. The disclosed system can be an attractive additional feature for cities that deploy Wi-Fi.

In case of an emergency, or in a security situation, the system can provide authorities an ability to scan and get information about parked cars remotely via a wireless system and can serve as a security add-on.

Using the system, municipalities and parking operators can manage their facilities better, compile helpful statistics and increase inventory control of the parking spaces resulting in better service and increased availability.

SUMMARY OF THE INVENTION

In accordance with the present invention, these are the invention's characteristics:

According to one aspect of the invention, a system and method is provided for using a wireless method to allow, assign, and decode a digital ID representative of a Vehicle Identification (ID) or Vehicle Identification Number (VIN) and allow the Vehicle ID to be broadcast wirelessly to trigger and allow telematics and other applications.

According to another aspect, there is provided a method for assigning a Vehicle ID or encode the Vehicle Identification Number (VIN) into a Wi-Fi or Bluetooth beacon module built-in the vehicle or as add-on device and allow it to be broadcast wirelessly for telematics applications. This method generally comprises the steps of: (a) Scan for a vehicle beacon ID or VIN number via wireless Wi-Fi or Bluetooth device (example car owner mobile phone) scanning can be done from long distance (b) receiving and decoding the car beacon ID (the car ID or the VIN decoded into the beacon module (c) receiving beacon/car ID trigger telematics application; for example return 2 parking application where the car ID will allow navigation to the location where the car is parking.

According to another aspect, there is provided a method for obtain the beacon/vehicle ID without exchanging any communication between the user mobile phone or other Wi-Fi or Bluetooth devices and no other communication like cellular technology or Internet access needed.

According to yet another aspect there is provided a method to apply the vehicle/beacon ID as a triggering mechanism to telematics and other applications.

BRIEF DESCRIPTION OF THE DRAWINGS

A better understanding of the present invention may be obtained by reference to the accompanying drawings, which should be considered in conjunction with the detailed description, all in accordance with the present invention.

Like reference numerals refer to like parts throughout the several views of the drawings.

DESCRIPTION OF THE PREFERRED EMBODIMENT

In all the figures of the drawings, sub-features and integral parts that correspond to one another bear the same reference symbol.

Figure 1:
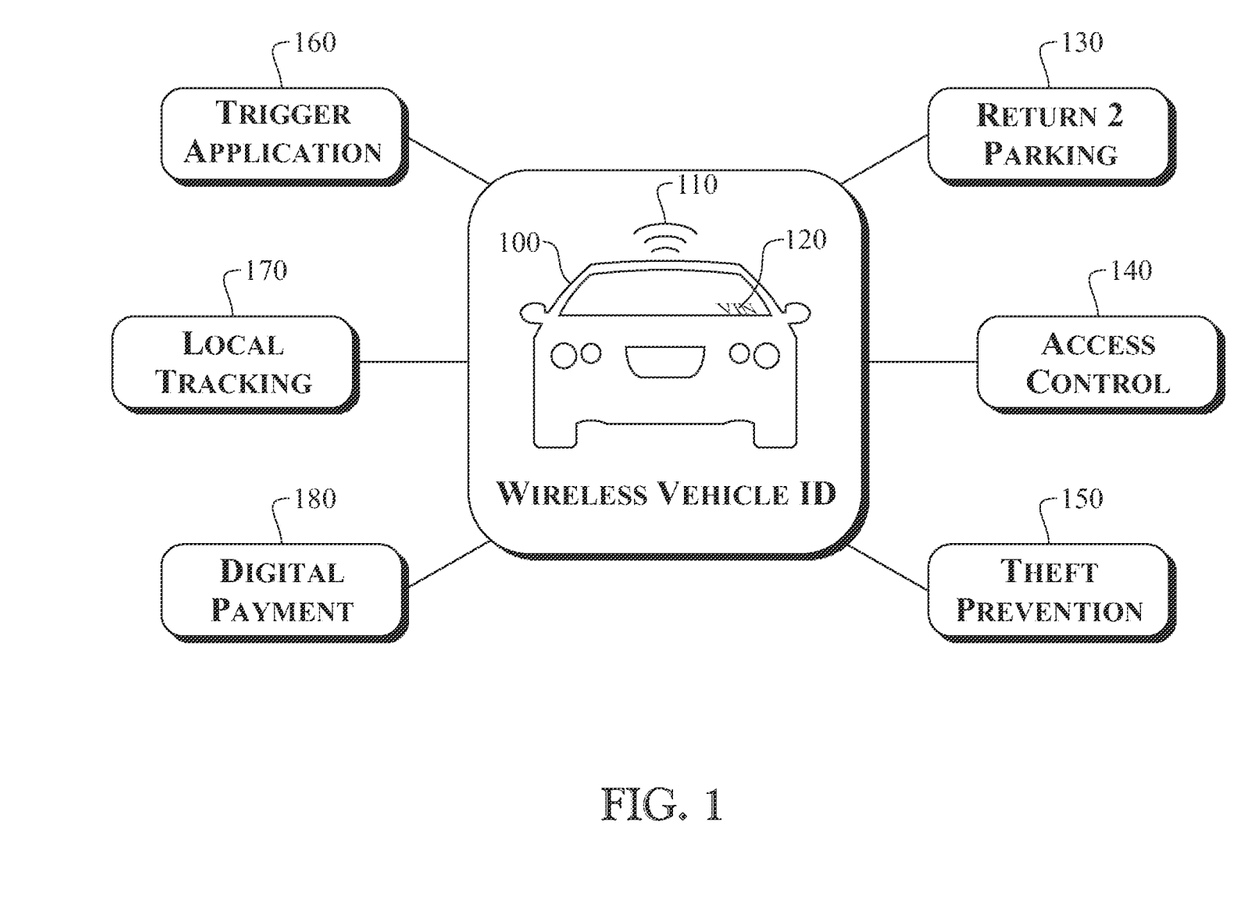
FIG. 1 is an illustration of the wireless Vehicle ID and some of the telematics and other applications that can be used by the method in accordance with the present invention.
Figure 2:
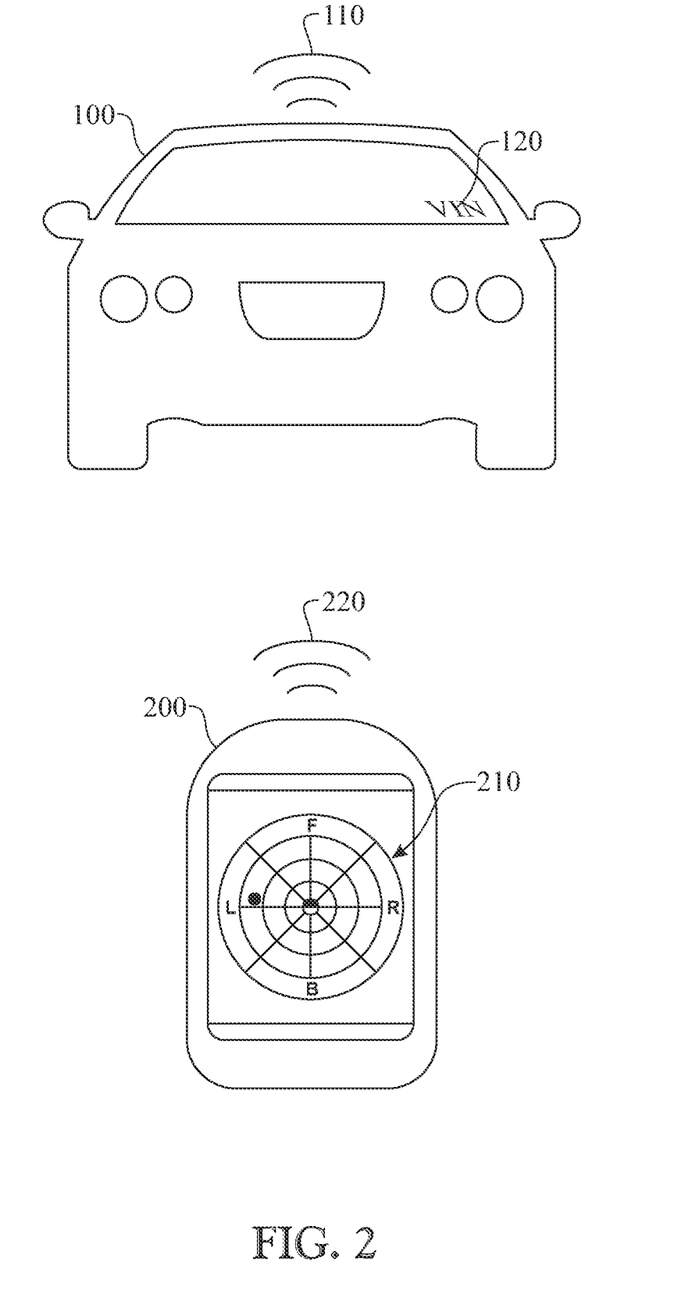
FIG. 2 is an illustration of the return 2 parking method as an application on a mobile phone in accordance with the present invention.
Figure 3:
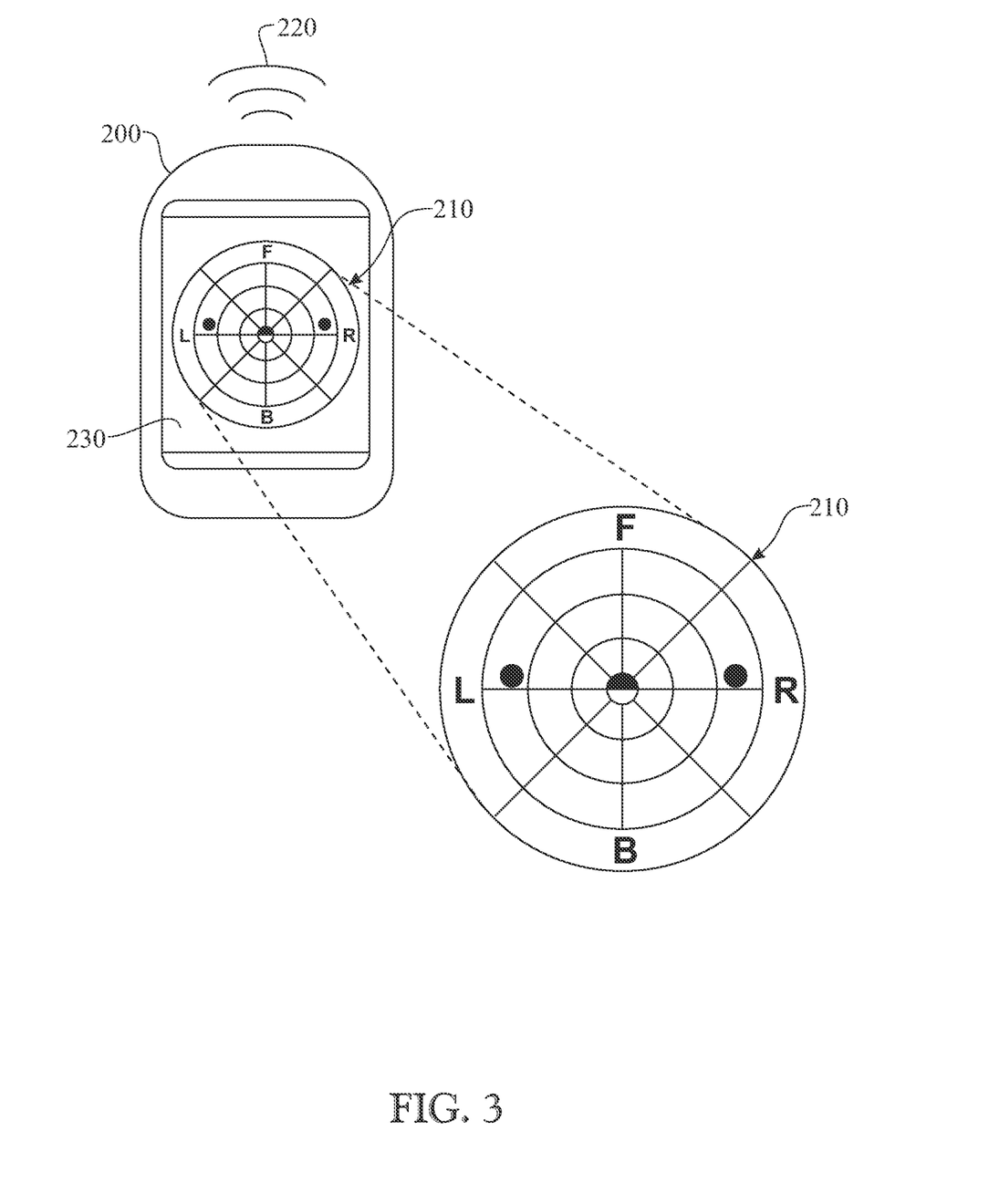
FIG. 3 is an illustration of the mobile phone application of return 2 parking in accordance with the present invention.

Referring now to the drawings in detail and first particularly to FIGS. 1-3 thereof.

These figures illustration of the wireless vehicle ID and the some of the telematics and other application that can be use the method.

Referring to FIG. 1 This shows the a vehicle 100, with installed Wi-Fi or Bluetooth module/beacon as built-in or add-on to the vehicle, the Vehicle ID or VIN can be encode into the Wi-Fi or the Bluetooth ID/name transferring it from physical number 120, to digital and allow it to be broadcast 110, for telematics and other applications, for example return2parking 130, using the broadcast of the car ID the vehicle owner can find an answer to the most problematic "where did I park my car?" dilemma.

Another application that can benefit from using the innovation method of broadcasting the vehicle ID is access control 140, knowing the vehicle VIN number wirelessly from remote (decoding) can allow the vehicle access to secure or strict area where there is a need for precise ID of the vehicle and it can serve as a replacement or add-on to a remote gate, access control, strict road access, permission access, and other security access that are deferent from a remote gate use today as it can be set using the precise Vehicle ID/VIN without a need for a remote and such allowing better control than the existing remote that can be moved from car to car.

Additional application that can benefit from using Vehicle ID broadcast are theft prevention 150, the disclosed system and method will allow the car's own VIN to be broadcast as additional theft prevention, providing a mechanism that surely will decrease the chances of your car being stolen. Most car thieves prefer to steal easy cars that have no anti-theft devices especially when the method describe above will allow the police easy way to scan and determine if the car is stolen, moreover there is a possibilities to add sensor to the beacons that will allow it to add notification to the broadcasting of the car ID in a case of emergency and or finding that the car is stolen.

As the car ID's are protected and secure from changing or protected by the car owner password to prevent unauthorized ability to modify the car ID.

The ability to have the car VIN broadcast or scan by the authorities from remote instead of going plate by plate will easy the police and other authorities work, more over it can easily replace or add-on to car plate recognition with remote scanning instead of one by one. In a way the disclosed method takes the physical old style VIN plate and applies it to the digital era.

Going to additional application 160, the RF beacon, Wi-Fi or Bluetooth will behave as a trigger mechanism for telematics and other application that can use the decode broadcast of the car ID/VIN to exploit many telematics and other application, or application delivery of local content according to the trigger ID provide by the disclosed method, the delivery of such content can be using the Internet and/or cellular communication where the basic concept is to have the ability to recognize and decode the car VIN for smart marketing, secure access, maintenance, parking, digital payments, add-on to prevent car theft as well as to track the car without GPS or other communication.

Another application that can be benefit from the ability to know wirelessly the car ID or VIN number are application that need to track the car especially when you need more precise way to track the car especially indoor or in an area where GPS can't be provided or there is need for more accuracy than GPS accuracy.

The ability to integrate the GPS tracking and or cellular ID tracking with the additional beacons installed in the car will provide high accuracy for tracking and it can also to add additional accuracy to the car GPS navigation.

Going to explorer additional application 180, that will benefit from using the digital wireless car ID or VIN as a way for secure payment in a gas station or pay for parking in a garage or in the street where the digital broadcast of the VIN or the car ID can be scan and decode to provide a secure way for payments a precise and protected way.

Our method provides the ability to broadcast the car ID/VIN when needed, meaning when it scan by the car owner device or other authorize devices The wireless beacon Wi-Fi or Bluetooth in the car can be in a "sleep mode" and "wake up" only for authorize scanning request saving power from the car and from the user scanning device, A.K.A. mobile unit or mobile phone with RF Bluetooth or Wi-Fi device that will allow to decode and use the broadcast car ID/VIN.

It must be note that there is no privacy issue to know or view the car VIN as anyone can access it easily by view the VIN attached to the car, what it is suggested in the disclosed method is taking a step to the digital era and making the VIN available to many usefully application for the benefit of the car owner, the public and the authorities when needed.

Referring to FIG. 2: This drawing illustrate return 2 parking application a solution to the everyday dilemma of most of drivers when trying to find out where one parked their car, the car 100, with Bluetooth or Wi-Fi device will broadcast 110 the car ID or the VIN 120 to the car owner mobile phone 200, where the mobile phone will use Wi-Fi or Bluetooth to scan 220 for the known car ID, must be note that the car owner and his mobile phone will scan only for the known car ID/VIN and not to other cars ID, the long range beacon in the car will be recognize by the mobile scanning and the car where about, the car location with ability to recognize the signal strength as well the direction the bearing will calculate the distance and will be displayed on a circular overlay image 210 on the user mobile phone device and will allow navigate to the park car—return 2 parking.

Going to FIG. 3: This drawing illustrates the application on the mobile phone 200 with Wi-Fi or Bluetooth 220 that will scan for the park car in return 2 parking application and display the car location over a circle overlay 210 on the mobile display 230.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

Having thus described the invention, what is desired to be protected by Letters Patent is presented in the subsequently appended claims.

I claim:

1. A method utilizing a personally assigned vehicle identification reference or a manufacturer's assigned vehicle identification number (VIN) as a reference for obtaining information, the method comprises the steps of:

encoding one of a vehicle identification reference (ID) or a vehicle identification number (VIN) number into an Radio Frequency (RF) beacon, wherein said RF beacon is located within the vehicle transmitting the encoding from the vehicle to another party, wherein said RF beacon utilizes at least one of a long range Bluetooth signal (a wireless communication protocol standard using short-wavelength radio waves in the ISM band from 2.4 to 2.485 GHz in accordance with industry standard IEEE 802.15) and Wi-Fi signal (a local area wireless technology that allows an electronic device to exchange data or connect to the internet using 2.4 GHz UHF and 5 GHz SHF radio waves in accordance with industry standard IEEE 802.11);

broadcasting the one of the vehicle ID or the VIN in a naming packet of the at least one of a long range Bluetooth signal and the Wi-Fi signal; and decoding the one of the vehicle ID or the VIN by an authorize wireless scanning device; and utilizing the decoded one of the vehicle ID or the VIN to initiate telematics and location base services (LBS) applications.

2. The method according to claim 1, the method further comprising a step of utilizing one of a Bluetooth or Wi-Fi device to scan and decode the one of the vehicle ID or the VIN.

3. The method according to claim 1, further comprising a step of integrating said RF beacon into a vehicle.

4. The method according to claim 3, further comprising a step of transmitting the one of the vehicle ID or the VIN only when the RF beacon detects a scanning request from an authorized device.

5. The method according to claim 1, further comprising a step of determining a location of the vehicle by using at least one RF beacon located at a distance from the vehicle.

6. The method according to claim 1, further comprising a step of determining a current position of a vehicle by a using the current car ID broadcasting signal in combination with at least one RF beacon located at a distance from the vehicle to determine a location of the vehicle when the vehicle is parked at an indoor location and a GPS method to determine the location of the vehicle when the vehicle is parked at an outdoor location.

7. The method according to claim 1, further comprising a step of initiating at least one telematics application utilizing the one of the vehicle ID or the VIN, wherein the at least one telematics application is one of:

a return 2 parking application, an access and security control, a protection add-on to prevent car theft, a scanning control mechanism enabling authorities to scan an area for stolen cars using a wireless scanning device that communicates with the RF beacon associated with the vehicle, a local tracking and add-on to the car GPS navigation for more precise accuracy when needed, and a digital secure payment method that can be use for gas or parking payment using the one of the vehicle ID or the VIN.

8. The method according to claim 1, further comprising a step of utilizing the one of the vehicle ID or the VIN obtained from the RF beacon associated with the vehicle to initiate access through at least one of a tollway, obtain access through a gate, and obtain access to a controlled roadway.

9. The method according to claim 1, further comprising a step of utilizing the one of the vehicle ID or the VIN obtained from the RF beacon associated with the vehicle to initiate electronic payment for parking.

10. The method according to claim 1, further comprising a step of utilizing the one of the vehicle ID or the VIN obtained from the RF beacon associated with the vehicle to initiate electronic payment for at least one of tolls, parking, and payment of gas, wherein the payment is processed through an account associated with the one of the vehicle ID or the VIN.

11. The method according to claim 1, further comprising a step of activating a telematics application, wherein the telematics application at least one of prevents car thefts and broadcasts the one of the vehicle ID or the VIN in an emergency situation to notify another party of the emergency situation.

12. The method according to claim 1, further comprising a step of activating a telematics application, wherein the telematics application tracks the vehicle location by broadcasting the one of the vehicle ID or the VIN.

13. The method according to claim 1, further comprising a step of activating a telematics application, wherein the telematics application provides initial and replenishment payments to a parking meter by utilizing the one of the vehicle ID or the VIN in conjunction with an associated payment transaction process.

14. The method according to claim 1, the method further employing a return 2 parking telematics application comprising steps of:
   scanning an area utilized for parking vehicles for one of the vehicle ID or the VIN;
   determining a precise location of the parked vehicle using the one of the vehicle ID or the VIN in conjunction with other RF devices deployed throughout the area utilized for parking vehicles;
   determining a distance and direction between a display device and the parking space; and
   providing navigation information to the user through an image displayed on the display device.

15. The method according to claim 14, further comprising a step of displaying a graphical image on the display device presenting navigation between a current position of the display device and the precise location of the parked vehicle.

16. The method according to claim 14, further comprising a step of presenting the graphical image as an omni directional circular display on the display device.

* * * * *